O. P. REDFORD.
ART OF MANUFACTURING JAWS FOR JAW RODS AND JAW BOLTS.
APPLICATION FILED JUNE 22, 1911.
1,010,687.
Patented Dec. 5, 1911.
2 SHEETS—SHEET 1.
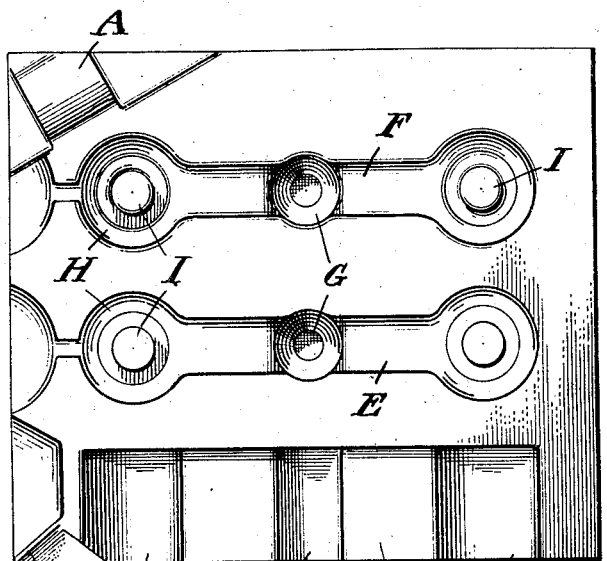
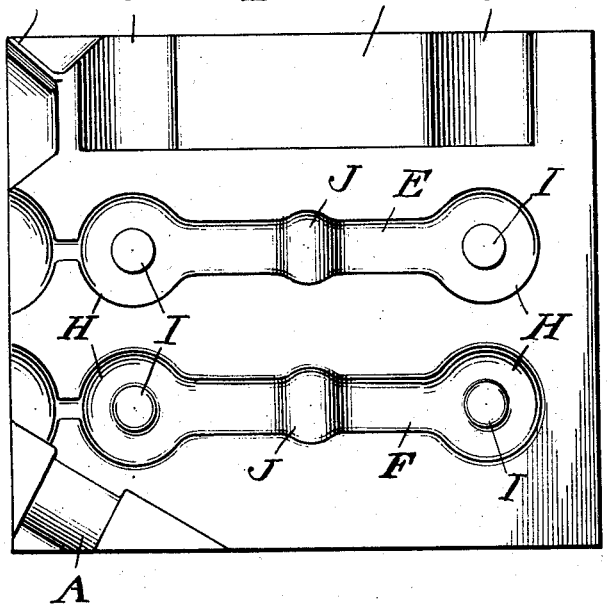

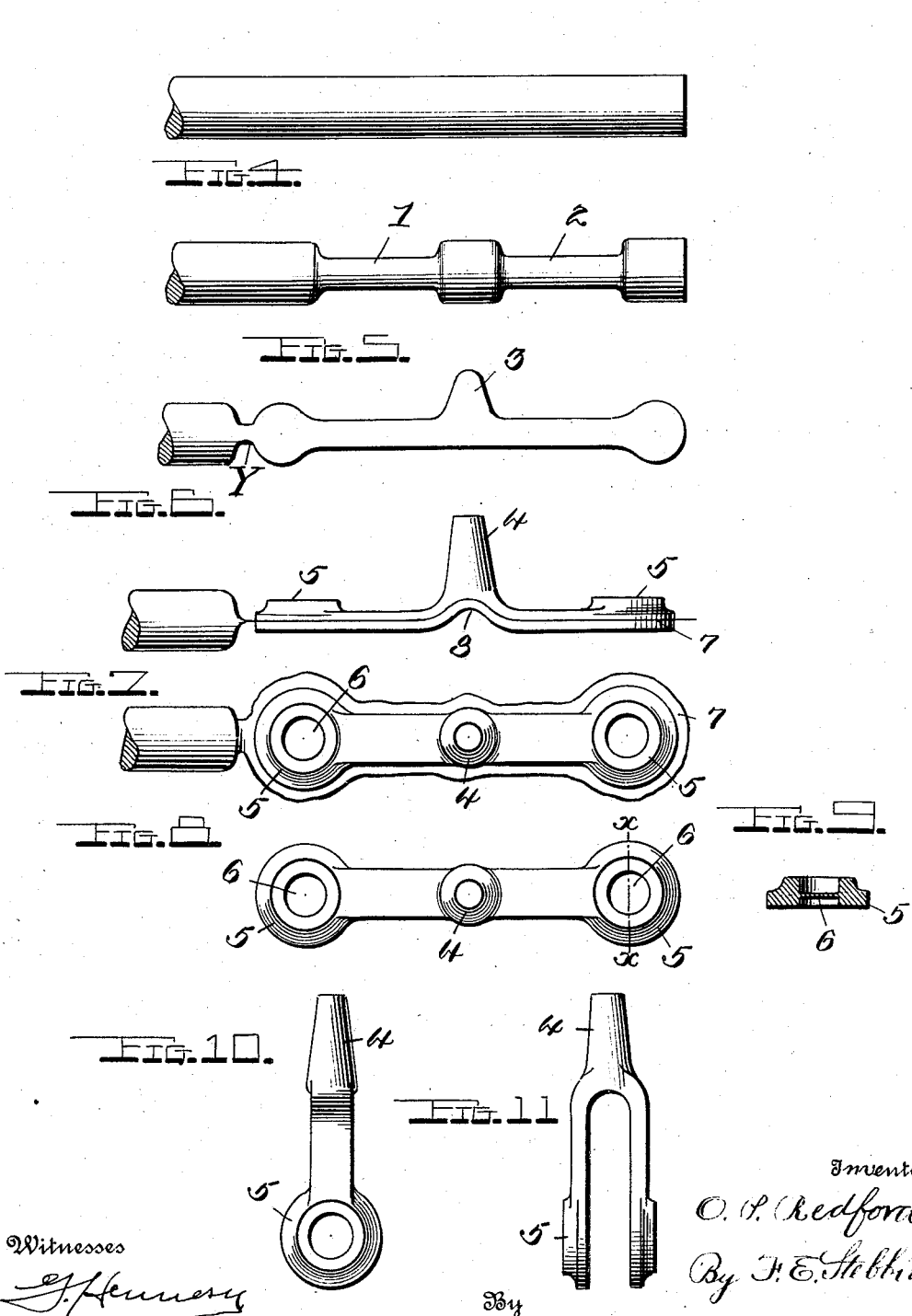

UNITED STATES PATENT OFFICE.

OSCAR P. REDFORD, OF RICHMOND, VIRGINIA, ASSIGNOR TO THE RICHMOND FORGINGS CORPORATION, A CORPORATION OF VIRGINIA.

ART OF MANUFACTURING JAWS FOR JAW-RODS AND JAW-BOLTS.

1,010,687.   Specification of Letters Patent.   Patented Dec. 5, 1911.

Application filed June 22, 1911. Serial No. 634,815.

*To all whom it may concern:*

Be it known that I, OSCAR P. REDFORD, a citizen of the United States, residing at Richmond, in the county of Henrico and State of Virginia, have invented certain new and useful Improvements in the Art of Manufacturing Jaws for Jaw-Rods and Jaw-Bolts, of which the following is a specification.

The object of my invention is the production of a forged jaw for jaw rods and jaw bolts, said jaw to be of a U-shape and fashioned from a single piece of iron or steel or other suitable material; which shall have sufficient metal at the shank or meeting point of the jaws so it can be welded or otherwise fastened to any type of rod or bolt, as desired; which shall be stronger, more rigid and less liable to split or fracture than jaws made by welding separate parts together; which shall be cheaper to manufacture than the so called welded jaws and jaws made by methods heretofore known; and which withal shall constitute a superior jaw for jaw rods and jaw bolts adapted to be used in boilers, bridges, brake riggings and for other purposes.

To attain the object and end above specified I have devised a new method or process of manufacturing jaws for such jaw rods and jaw bolts, which method is hereinafter fully set forth in the best method of procedure I have so far devised for the purpose and which illustrates the application of the principle.

The accompanying drawings will aid in the exposition and understanding of the several steps of my new methods of procedure.

Figure 1 shows the face of the top steel die used in forging the jaw. Fig. 2 shows the face of the bottom steel die. Fig. 3 shows side and cross sectional views of a part of a rod or bar from which the jaws are to be made. Fig. 4 shows a side view of the rod or bar transformed by the first step of the process. Fig. 5 shows in side elevation the shape resulting from the second step of the process. Figs. 6 and 7 are side and top plan views of the jaw partly fashioned by the third step of the process. Fig. 8 is a top plan of the partly fashioned jaw with the fin or surplus metal removed. Fig. 9 is a section on line $x, x$ of Fig 8. Figs. 10 and 11 are different views in elevation of the completely fashioned jaw.

The dies preferably used in fashioning the metal to the required shape are adapted for connection to a suitable hammer or press and are so set that the corresponding projections and intaglios of the two dies match each other in a well known way.

First, the rod or bar, shown by Fig. 3, is heated to a good forging heat and held between the dies at A, where the metal is in relief, to reduce the size of the bar or rod in two places designated 1 and 2 in Fig. 4.

Secondly, the rod or bar is then forged between the intaglios B, which have the concave shapes C in each and the wedge shaped recess D in the top die. A few blows give the metal the shape shown by Fig. 5, the ends having curved surfaces and the metal at 3 being of a wedge or tapering shape.

Thirdly, the blank is next forged successively between the intaglios E and F which are alike except that intaglios F in outline are sharper and more distinct in outline than those at E, the latter of which give the final shape to the metal. In other words, the metal at first is forced into approximate shape without clearly defined lines, this being necessary to cause the metal to flow to its proper place and avoid waste when subjected to the final forging step. As a result of this third step of the process the metal has the shape shown by Figs. 6 and 7, the metal at 4 being of a tapering shape, bosses or enlargements 5 being formed at the ends each with a thin diaphragm of metal at 6, and a surrounding fin 7, as clearly shown. Obviously, to give the above described shape the top die has a tapering recess at G, both dies circular recesses at H, and cylindrical portions I, or plugs, in relief inside the recesses H. The lower die may have a curved projection J to form the recess 8 opposite the tapering projection at 4.

Fourthly, the fin 7 or small amount of surplus metal which is forced out around the edge, where a small depression or gutter may be formed in the dies to receive it, is removed, preferably by the use of a trimming die operating in a press. Fig. 8 shows the forging with the fin removed.

Fifthly, the forging as shown by Fig. 8 is reheated and the ends bent to the shape shown by Figs. 10 and 11 so that they lie in planes substantially parallel to the longitudinal axis of the tapering projection.

As the forging is generally made on the end of a long rod or bar the dies may be provided with cutters X to sever the successive forgings from the bar on the line Y. The diaphragms of metal 6 at the ends of the jaws may be removed by punching, or where the diameters of the holes are to be exact, by drilling or otherwise.

From the foregoing description taken in connection with the drawings it will be seen that I have produced a very strong forged jaw without the weakness resulting from the welding or riveting of parts together, and by a process in which the jaws can be quickly fashioned and the first cost much reduced as compared with other known methods.

It is to be noted that while I have specifically explained only one mode of performing my improved process, I do not thereby intend to exclude from the scope of the claims other modes involving slight immaterial or colorable variations or changes in the number or succession of the steps taken. For instance, the shape of the jaw may be slightly changed, the process not entirely be performed in the same dies but partly carried out on other dies, or some part or parts of the process may be performed by other machines such as a press or rollers. The size of the jaws may, of course, be varied and their relative dimensions also varied, and when so varied they will be forged between dies specially adapted for the purpose.

What I claim as new and desire to secure by Letters Patent is:

1. The method of forming jaws for jaw rods and jaw bolts, consisting in heating a suitable bar or rod of metal, reducing the diameter thereof at two places remote from the end forming depressions; striking up the metal intermediate the depressions to form a projection and rounding the metal adjacent the ends of the depressions; fashioning the said projection to a tapering shape and spreading the rounded portions of the metal to enlarged diameters; and finally bending the ends of the forging into planes substantially parallel with the plane of the said projection.

2. The method of forming jaws for jaw rods and jaw bolts, consisting in heating a suitable bar or rod of metal, reducing the diameter thereof at two places remote from one end forming depressions; striking up the metal intermediate the depressions to form a projection and rounding the metal adjacent the ends of the depressions; fashioning the said projection to a tapering shape and spreading the rounded portions of the metal to increased diameters and forming recesses therein; removing the metal diaphragms within the enlargements at the ends; and finally bending the ends of the forging into planes substantially parallel to the longitudinal axis of the said projection.

3. The method of forming jaws for jaw rods and jaw bolts, consisting in heating a suitable bar or rod of metal, reducing the diameter thereof at two places remote from one end forming depressions; striking up the metal intermediate the depressions to form a projection; elongating the said projection and forging and spreading the metal at the ends of the depressions into enlarged diameters; removing the fin surrounding the forging; and finally bending the ends of the forging into planes substantially parallel with the longitudinal axis of the said projection.

4. The method of forming jaws for jaw rods and jaw bolts, consisting in heating a suitable bar or rod of metal, striking up the metal remote from one end to form a projection; spreading the metal at points each side of the projection; heating and bending the metal each side of the projection to form jaws lying in planes substantially parallel with the longitudinal axis of the projection; and making holes through the ends of the jaws.

In testimony whereof I affix my signature in presence of two witnesses.

OSCAR P. REDFORD.

Witnesses:
W. R. WILLIAMS,
CHAS. W. KAHN.